(12) United States Patent
Li et al.

(10) Patent No.: US 7,780,473 B2
(45) Date of Patent: Aug. 24, 2010

(54) PLUG CONNECTOR AND METHOD OF MANUFACTURING THE SAME

(75) Inventors: Xiao-Li Li, Kunshan (CN); Ping-Sheng Su, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/436,799

(22) Filed: May 7, 2009

(65) Prior Publication Data

US 2009/0280697 A1 Nov. 12, 2009

(30) Foreign Application Priority Data

May 7, 2008 (CN) .......................... 200810301456

(51) Int. Cl.
*H01R 13/40* (2006.01)
(52) U.S. Cl. .................... 439/604; 439/736; 439/668
(58) Field of Classification Search ................ 439/604, 439/736, 606, 668, 669
See application file for complete search history.

(56) References Cited

U.S. PATENT DOCUMENTS

| 5,322,451 | A | * | 6/1994 | Guss et al. ................... 439/321 |
| 5,580,264 | A | * | 12/1996 | Aoyama et al. .............. 439/275 |
| 6,623,299 | B1 | * | 9/2003 | Liu ............................. 439/604 |
| 6,740,812 | B2 | * | 5/2004 | DeWitt et al. ............... 174/650 |
| 6,957,970 | B2 | * | 10/2005 | Weigel et al. ............... 439/320 |
| 2009/0305573 | A1 | * | 12/2009 | Wu ............................ 439/669 |

FOREIGN PATENT DOCUMENTS

TW         M250397         11/2004

* cited by examiner

*Primary Examiner*—Hien Vu
(74) *Attorney, Agent, or Firm*—Wei Te Chung; Andrew C. Cheng; Ming Chieh Chang

(57) ABSTRACT

A plug connector comprises a terminal electrically terminated to a cable. An inner molding is circumferentially formed on a connection between the terminal and the cable. A first outer molding is circumferentially formed on an external peripheral surface of the inner molding and a portion of the cable, the first outer molding is defined by a front section and a rear section with an outer diameter being larger than that of the front section. A second outer molding is circumferentially formed on an external peripheral surface of the front section of the first outer molding and interfered with the terminal.

7 Claims, 5 Drawing Sheets

PLUG CONNECTOR AND METHOD OF MANUFACTURING THE SAME

FIELD OF THE INVENTION

The present invention relates to a plug connector, and more particularly to a plug connector with a colorful molding and a method of manufacturing the same.

DESCRIPTION OF PRIOR ART

Generally, an insulative housing of the audio plug is formed using one or more injection molding processes to make the insulative housing has one or more colors. The insulative housing may be configured by a first molding and a second molding formed on an external peripheral surface of a front section of the first molding using injection molding process. The first molding is formed by a front section and a rear section, and the outer diameter of the front section is smaller than that of the rear section. While, the joint between the first molding and the second molding is not regular as the first molding having a vertical front surface which is easily and directly impacted by the plastic flow of the second molding. Although the process of manufacturing the audio plug is easy and convenient, but as the joint between the first molding and second molding is crooked, so the color of the first molding and the color of the second molding will be mixed with each other at the joint. At sometimes, the first and second moldings are not well-knit at the joint between the first and second moldings, so the second molding will be easily fallen off from the first molding in the course of normal use. For the above said reasons, this kind of audio plug has some obvious defections to influence the quality of product.

As discussed above, an improved plug connector overcoming the shortages of existing technology is needed.

SUMMARY OF THE INVENTION

Accordingly, an object of the present invention is to provide a plug connector with a colorful molding and a method of manufacturing the same.

In order to achieve the above-mentioned objects, a plug connector comprises a terminal electrically terminated to a cable. An inner molding is circumferentially formed on a connection between the terminal and the cable. A first outer molding is circumferentially formed on an external peripheral surface of the inner molding and a portion of the cable, the first outer molding is defined by a front section and a rear section with an outer diameter being larger than that of the front section. A second outer molding is circumferentially formed on an external peripheral surface of the front section of the first outer molding and interfered with the terminal.

In order to achieve the above-mentioned objects, a method for making a plug connector comprises providing a cable connected to a terminal; forming an inner molding between the terminal and the cable using injection molding process; forming a first outer molding on an external peripheral surface of the inner molding and a portion of the cable using an injection molding process, the first outer molding formed by a front section and a rear section with an outer diameter being larger than that of the front section; and forming a second outer molding on an external peripheral surface of the front section of first outer molding and interfered with the terminal using an injection molding process.

Other objects, features and advantages of the invention will be apparent from the following detailed description taken in connection with the accompanying drawings.

DETAILED DESCRIPTION OF PREFERRED EMBODIMENTS

Figure 1:
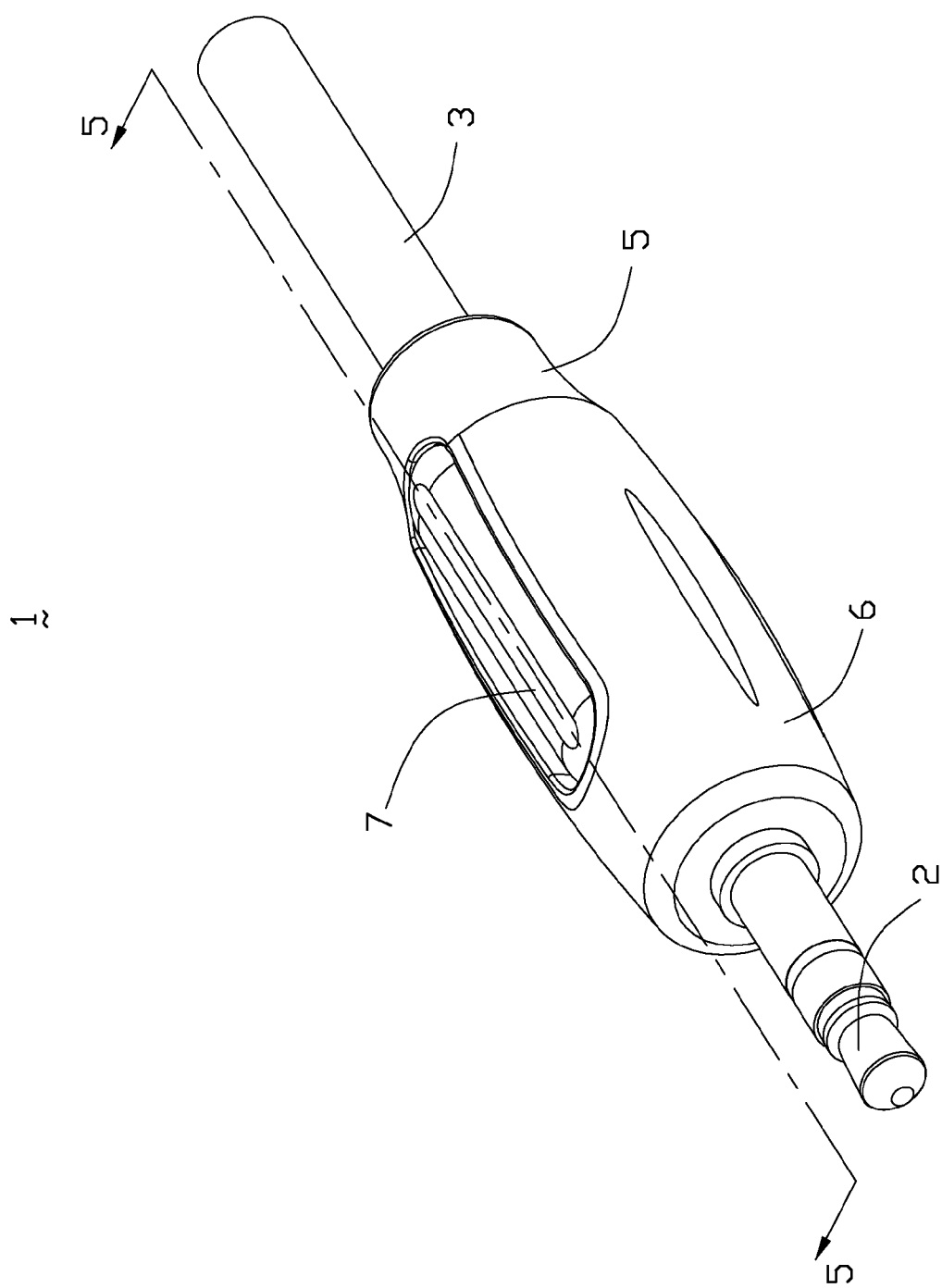
FIG. 1 is a perspective view of a plug connector in accordance with the present invention.

Reference will now be made to the drawing figures to describe the present invention in detail.

Figure 2:
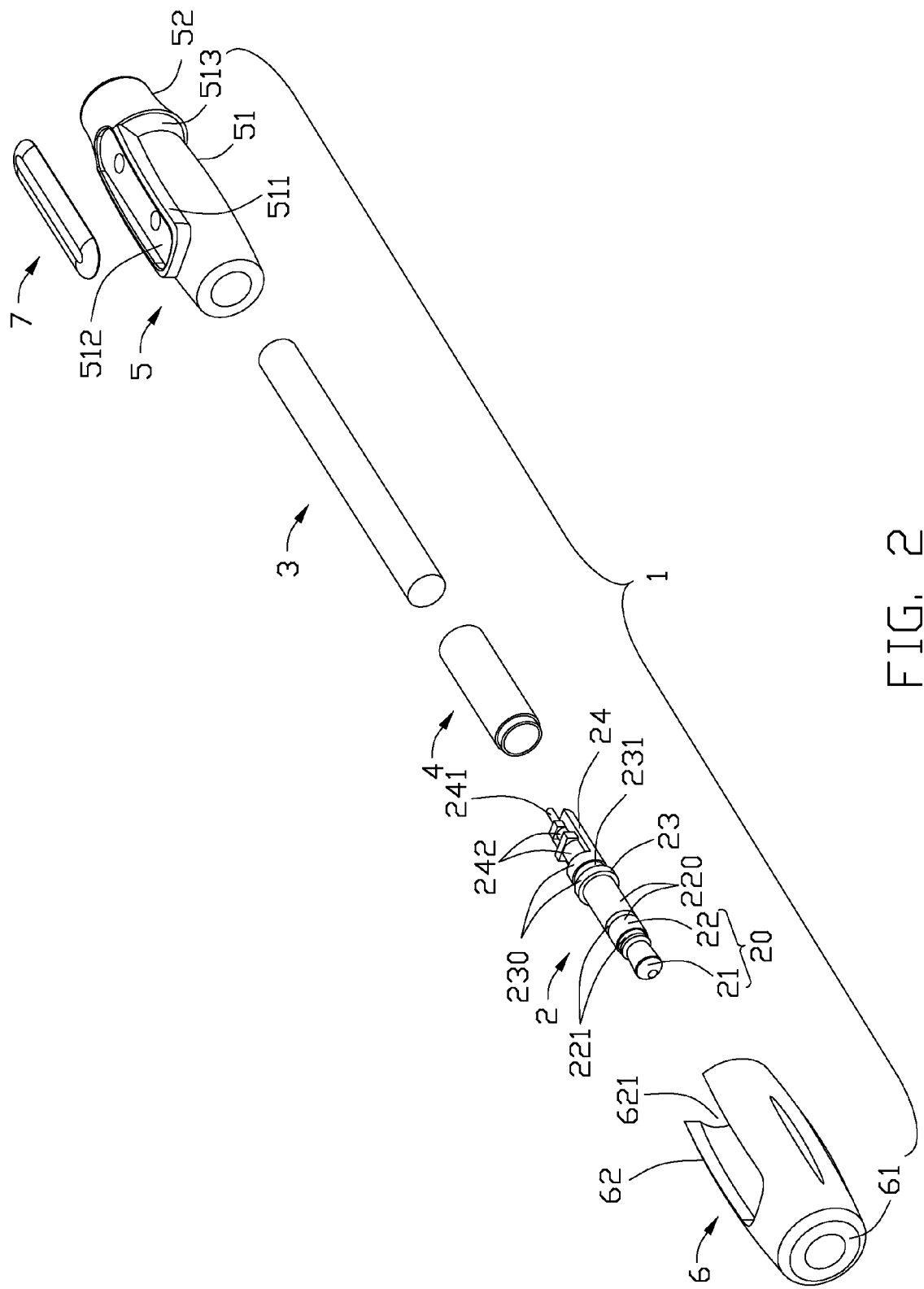
FIG. 2 is an exploded, perspective view of the plug connector of FIG. 1.
Figure 5:
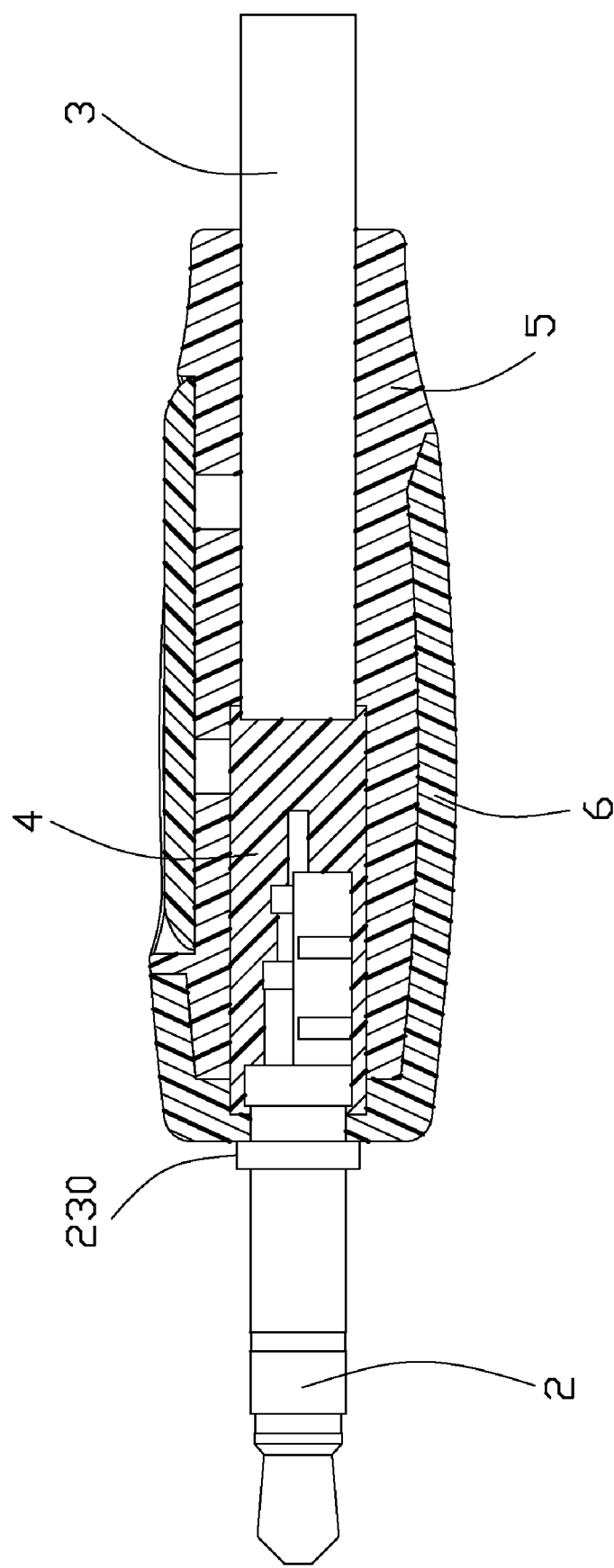
FIG. 5 is a cross section view of the plug connector of FIG. 1 taken along line 5-5.

Referring to FIGS. 1, 2 and 5, a plug connector 1 in accordance with the present invention includes a terminal 2 and a cable 3 electrically connected to the terminal 2. An inner molding 4 is circumferentially formed on a connection between the terminal 2 and the cable 3. A first outer molding 5 is formed around the inner molding 4 and a portion of the cable 4. A second outer molding 6 is formed around the first outer molding 5 and interfered with the terminal 2.

Referring to FIG. 2, the terminal 2 is used for transmitting audio-signal. The terminal 2 includes a mating portion 20 at a front end thereof for electrically connecting with a corresponding contact of the complementally connector, a tail portion 24 at a rear end thereof for electrically connecting with a wire (not shown) of the corresponding cable 3 and a retaining member 23 disposed between the mating portion 20 and the tail portion 23. The mating portion 20 has a base section 22 and a metallic contact tip 21 extending forwardly from the base section 22. The base section 22 defines two annular metallic tubes 220 and two insulative rings 221. One insulative ring 221 is disposed between the contact tip 21 and the metallic tube 220, and another insulative ring 221 is disposed between the two metallic tubes 220. The retaining member 23 includes a pair of spaced annular projecting loops 230 and a groove 231 formed therebetween. The tail portion 23 defines two annular metallic tubes 242 and a metallic cylindrical portion 241 along the axis of the terminal 2 in the front-to-rear direction.

Figure 3:
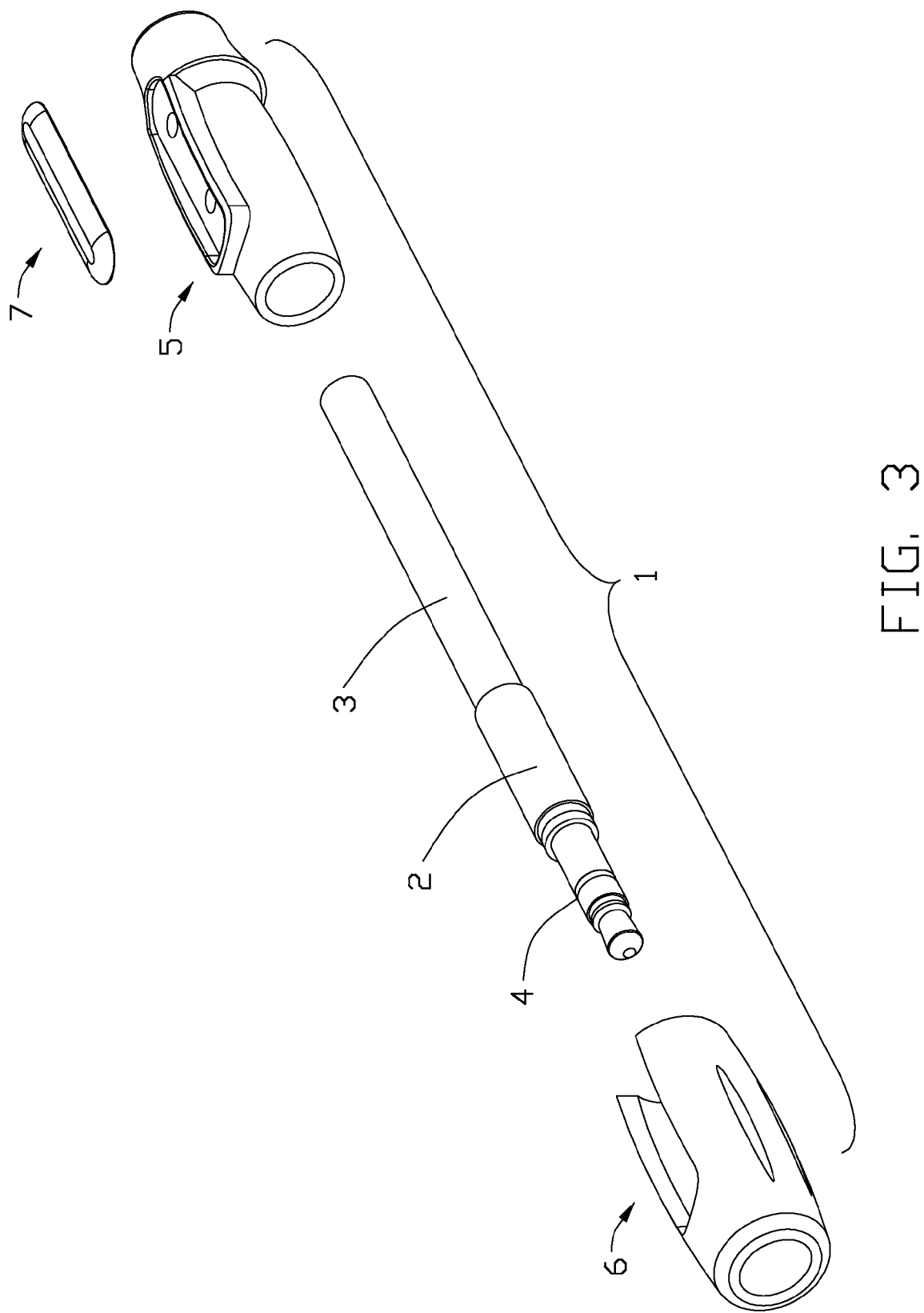
FIG. 3 is a partial assembled, perspective view of the plug connector of FIG. 1.
Figure 4:
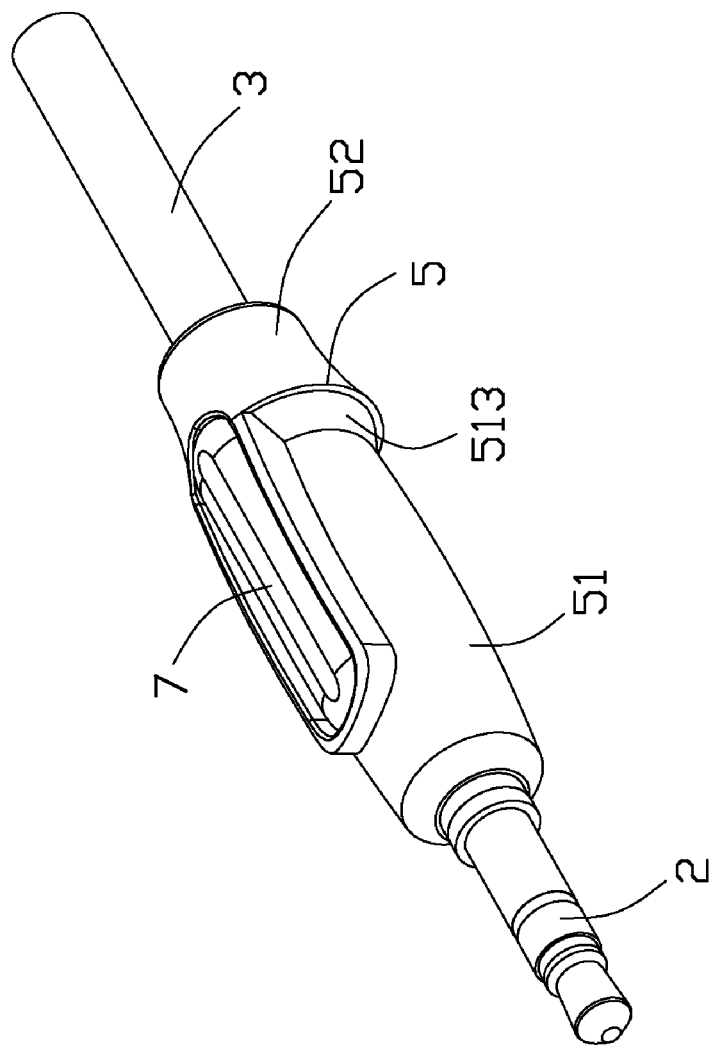
FIG. 4 is a partial assembled, perspective view of the plug connector of FIG. 1.

Please refer to FIGS. 2 and 3, the wires (not shown) of the cable 4 can be soldered to the metallic cylindrical portion 241 and the annular metallic tubes 242 to achieve the electrically connection therebetween. An inner molding 4 is formed on a connecting area between the terminal 2 and the cable 3. The inner molding 4 is used to protect the connection between the terminal 2 and the cable 3.

Please refer to FIGS. 1 to 5, the first outer molding 5 is circumferentially formed on the external peripheral surface of the inner molding 4 and a portion of the cable 3 which is disposed on the backside of the inner molding 4. The first outer molding 5 defines a stepped external peripheral surface thereof. The first outer molding 5 defines a front section 51 and a rear section 52, and the outer diameter of the front section 41 is smaller than that of the rear section 52, so a filling space (not figured) is formed around the front section 41. A platform 511 is formed on the external peripheral surface and connected to the rear section 52. The platform 511 defines a slot 512 extending to a front edge of the rear section 52. A grasping portion 7 can be disposed into the slot 512. The rear section 52 of the first outer molding 5 defines an inclined front surface 513 connecting the external peripheral surface of the front section 51 to the external peripheral surface of the rear section 52. Preferably, the first outer molding 5 is formed using an injection molding process.

As shown in FIGS. 2 to 5, the second outer molding 6 is formed on the external peripheral surface of the front section 51 of the first outer molding 5 and interfered with the terminal 2. The second outer molding 6 is formed by a front wall 61 with a hole thereof and a circular wall 62 extending rearwardly from peripheral sides of the front wall 61. The front wall 61 has a portion disposed in a groove 231 between the pair of spaced annular projecting loops 230 of the retaining member 23 of the terminal 2. Thus, the second outer molding 6 is interference with the terminal 2. Additional, the circular wall 62 of the second outer molding 6 is formed on the external peripheral surface of the front section 51 of the first outer molding 5 and has a side surface attached to the inclined front surface 513 of the rear section 52 of first outer molding 5. The second outer molding 6 has an external peripheral surface flush with that of the rear section 52 of the first outer molding 5. Preferably, the second outer molding 6 is formed using an injection molding process. Please refer to FIG. 1 in conjunction with FIG. 4, in the process of forming the second outer molding 6, molten plastic will flow to the front surface 513 of the rear section 52 of first outer molding 5, as the front surface 513 is an inclined plane, so the wallop from the flowing material and focused on the front surface 513 will be cushioned. After the second outer molding 6 is formed around the front section 51 of the first outer molding 5, the joint line between the first outer molding 5 and the second outer molding 6 is kept straight and close.

Referring to FIGS. 1 to 5, the method for making the plug connector 1 in according to the present invention starts from soldering the terminal 2 to the cable 3. An inner molding 2 is then injection molded on a connection between the terminal 2 and the cable 3. A first outer molding 5 is then injection molded around the external peripheral surface of the inner molding 4 and a portion of the cable 3. At last a second outer molding 6 is formed on the external peripheral surface of the front section 51 of the first outer molding 5 and interfered with the retaining member 23 of the terminal 2.

After the above steps, the entire process of manufacturing the plug connector 1 is finished. Further, the plug connector 1 can has a third outer molding (not shown) formed on the first outer molding 5 or second outer molding 6.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A plug connector, comprising:
   a terminal;
   a cable electrically terminated to the terminal;
   an inner molding circumferentially formed on a connection between the terminal and the cable; a first outer molding circumferentially formed on an external peripheral surface of the inner molding and a portion of the cable, the first outer molding defined by a front section and a rear section with an outer diameter larger than that of the front section; and
   a second outer molding having a cutout and circumferentially formed on an external peripheral surface of the front section of the first outer molding and interfered with the terminal;
   wherein the rear section of the first outer molding has an inclined front surface;
   wherein the front section of the first outer molding defines a platform formed on the external peripheral surface thereof for receiving in the cutout and connected to the rear section;
   wherein the platform defines a slot extending rearwardly to a front edge of the rear section of the first outer molding;
   wherein the terminal defines a mating portion at a front end thereof, a tail portion at a rear end thereof and a retaining member disposed between the mating portion and the tail portion; and
   wherein the retaining member includes a pair of spaced annular projecting loops and a groove formed therebetween, the mating portion has a base section and a metallic contact tip extending forwardly from the base section and the tail portion defines two annular metallic tubes and a metallic cylindrical portion along the axis of the terminal in the front-to-rear direction.

2. The plug connector as recited in claim 1, wherein the second outer molding has an external peripheral surface flush with that of the rear section of the first outer molding.

3. The plug connector as recited in claim 1, wherein the second outer molding is formed by a front wall interfered with the terminal and a circular wall extending rearwardly from peripheral sides of the front wall and covering the front section of the first outer molding.

4. The plug connector as recited in claim 1, wherein the plug connector further defines a grasping portion received into the slot.

5. The plug connector as recited in claim 1, wherein the base section of the mating portion defines two annular metallic tubes and two insulative rings.

6. A plug connector comprising:
   a terminal;
   a cable electrically and mechanically connected to a rear portion of the terminal; an inner molding circumferentially covering said rear portion via an over-molding process under condition that a projection vs. recess structure is formed on an interface between the inner molding and the terminal for preventing a relative axial movement between the inner molding and the terminal; an outer molding circumferentially covering the inner molding; wherein a front end region of the outer molding extends forwardly beyond the inner molding and is interlocked with the terminal both axially and circumferentially;
   wherein said outer molding includes an inside outer molding part and an outside outer molding part enclosing said inside outer molding part, and said inside outer molding part extends rearwardly beyond said outside outer molding part;
   wherein said outside outer molding part defines a cutout and said inside outer molding part defines a radial projection received in said cutout;
   wherein said projection defines a slot and a discrete grasping portion is installed into said slot;
   wherein the terminal defines a mating portion at a front end thereof, a tail portion at a rear end thereof and a retaining member disposed between the mating portion and the tail portion; and
   wherein the retaining member includes a pair of spaced annular projecting loops and a groove formed therebetween, the mating portion has a base section and a metallic contact tip extending forwardly from the base section and the tail portion defines two annular metallic tubes and a metallic cylindrical portion along the axis of the terminal in the front-to-rear direction.

7. The plug connector as claimed in claim 6, wherein said outside outer molding part is softer than the inside outer molding part and said grasping portion.

* * * * *